(12) United States Patent
Higgins et al.

(10) Patent No.: US 11,255,576 B2
(45) Date of Patent: Feb. 22, 2022

(54) CLOSED LOOP ENERGY PRODUCTION FROM PRODUCING GEOTHERMAL WELLS

(71) Applicant: GreenFire Energy Inc., Emeryville, CA (US)

(72) Inventors: Brian S. Higgins, Emeryville, CA (US); Joseph A. Scherer, Emeryville, CA (US); Dan Hoyer, San Francisco, CA (US)

(73) Assignee: GreenFire Energy Inc., Emeryville, CA (US)

( * ) Notice: Subject to any disclaimer, the term of this patent is extended or adjusted under 35 U.S.C. 154(b) by 0 days.

(21) Appl. No.: 16/968,370

(22) PCT Filed: Feb. 8, 2019

(86) PCT No.: PCT/US2019/017296
§ 371 (c)(1),
(2) Date: Aug. 7, 2020

(87) PCT Pub. No.: WO2019/157341
PCT Pub. Date: Aug. 15, 2019

(65) Prior Publication Data
US 2021/0062682 A1    Mar. 4, 2021

Related U.S. Application Data

(60) Provisional application No. 62/627,809, filed on Feb. 8, 2018.

(51) Int. Cl.
*F24T 10/17*    (2018.01)
*F24T 10/20*    (2018.01)
(Continued)

(52) U.S. Cl.
CPC .............. *F24T 10/17* (2018.05); *F01K 23/02* (2013.01); *F03G 4/001* (2021.08); *F03G 4/029* (2021.08);
(Continued)

(58) Field of Classification Search
CPC .. F03G 7/04; F03G 7/045; F03G 7/047; F24T 10/17; E21B 43/121–13; Y02E 10/10
See application file for complete search history.

(56) References Cited

U.S. PATENT DOCUMENTS 4,328,673 A * 5/1982 Matthews ................. F03G 7/04
                                                        60/641.4
4,364,232 A * 12/1982 Sheinbaum ............. F24T 10/40
                                                        60/641.2
(Continued)

FOREIGN PATENT DOCUMENTS

| JP | 57124078 A | * | 8/1982 |
| JP | 2014084857 A | | 5/2014 |
| KR | 10-2010-0099203 A | | 9/2010 |

OTHER PUBLICATIONS

International Search Report issued in International Application No. PCT/US2019/017296 dated May 28, 2019 (3 pages).
(Continued)

*Primary Examiner* — Laert Dounis
(74) *Attorney, Agent, or Firm* — Osha Bergman Watanabe & Burton LLP

(57) ABSTRACT

Methods and systems for producing thermal or electrical power from geothermal wells. Power is produced from a working fluid circulating in a closed loop within a geothermal well. Geothermal steam or brine at depth transfers heat at higher temperature than at the surface to the working fluid. The working fluid is then used to produce power directly or indirectly. The geothermal production fluid may be stimulated through use of gas lifting or submersible
(Continued)

pumps to assist in bringing such fluids to the surface or through the use blockers to encourage the downhole steam advection and brine recirculation through the resource in a connective loop. The working fluid may be compatible with existing direct heat or power generation equipment; i.e., water for flash plants or hydrocarbons/refrigerants for binary plants.

19 Claims, 9 Drawing Sheets

(51) Int. Cl.
*F01K 23/02* (2006.01)
*F28D 20/00* (2006.01)
*F03G 4/00* (2006.01)
*F03G 7/04* (2006.01)

(52) U.S. Cl.
CPC ............... *F03G 4/031* (2021.08); *F03G 7/04* (2013.01); *F03G 7/045* (2021.08); *F24T 10/20* (2018.05); *F28D 20/0052* (2013.01); *Y02E 10/10* (2013.01)

(56) References Cited

U.S. PATENT DOCUMENTS

| | | |
|---|---|---|
| 6,073,448 A | 6/2000 | Lozada |
| 9,121,393 B2 | 9/2015 | Schwarck |
| 2009/0250200 A1 | 10/2009 | Kidwell et al. |
| 2011/0232858 A1 | 9/2011 | Hara |
| 2012/0018120 A1 | 1/2012 | Danko |
| 2013/0202363 A1* | 8/2013 | Haemers .................. B09C 1/00 405/258.1 |
| 2014/0075938 A1* | 3/2014 | Bronicki .................. F03G 7/00 60/641.5 |
| 2014/0206912 A1 | 7/2014 | Iglesias |
| 2015/0122453 A1* | 5/2015 | Colwell .................. F24T 10/30 165/45 |
| 2015/0330670 A1 | 11/2015 | Wynn, Jr. |

OTHER PUBLICATIONS

Written Opinion issued in International Application No. PCT/US2019/017296 dated May 28, 2019 (9 pages).

Extended European Search Report issued in corresponding EP Application No. 19750830 dated Sep. 14, 2021 (7 pages).

* cited by examiner

CLOSED LOOP ENERGY PRODUCTION FROM PRODUCING GEOTHERMAL WELLS

FIELD OF THE DISCLOSURE

The present invention relates generally to apparatus and methods for recovering energy from geothermal reservoirs. More specifically, the present invention relates to apparatus and methods for increasing the productivity of nonproducing geothermal wells, marginally producing geothermal wells, or even productive geothermal wells.

BACKGROUND

As the effects of greenhouse gases become more apparent, more emphasis has been placed on the further development of renewable energy resources. Power from solar and wind is intermittent and poses problems for the electrical grid, which require expensive storage solutions to address. In contrast, power produced from geothermal energy is base-load power that can be flexibly dispatched. Nevertheless, geothermal power is underutilized. A principal reason for this underutilization is the high expense of locating appropriate hydrothermal resources and drilling successful hydrothermal wells. Many wells drilled into such resources are only marginally successful, have too much non-condensable gases, are simply not powerful enough to be connected to power conversion systems, or, if initially successful, they lose substantial power generation capacity over time.

Existing geothermal power systems include flashing geothermal brine to maximize the quantity and enthalpy of dry steam that can be used in a steam turbine to generate power directly. Similarly, if a geothermal well produces dry steam, all of the steam can be used in a steam turbine to generate power directly. Alternatively, the heat from the brine or flashed liquid portion of the brine can be used to generate power by transferring the heat to a separate working fluid at the surface operating in a closed loop, which is often referred to as a binary power plant using an Organic Rankine Cycle (ORC). In each case, geothermal steam and/or brine is produced from the well, which is then used to either produce power directly or to transfer heat to a second working fluid to produce power indirectly. Sometimes both methods are used.

Some limitations arise from using the above methods. First, the produced geothermal brine needs to be of sufficiently high pressure so that it can be used for power production, and typically all wells in a field should produce at the same pressure; i.e., the system pressure. As most wells exhibit a monotonically-decreasing relationship between pressure and flow, a limitation on the required produced pressure is equally a limitation on the amount of fluid that can be produced. The lack of sufficient pressure from a geothermal well, or equivalently, a low mass flow at an acceptable pressure, is a severe restriction to producing geothermal power. The ability to produce power from lower pressure, higher flow geothermal fluids is desirable.

A second limitation of the above methods is that as geothermal brine and steam expands in its rise to the surface, it loses pressure and temperature due to expansion. There is commonly additional heat loss to the surrounding rock as the fluid approaches the surface. A power system that takes advantage of higher temperatures and pressures lower in the well relative to the surface is desirable.

A third limitation of the above methods is that geothermal brine often contains high concentrations of leached chemicals, which can cause corrosion or scale to downstream equipment, requiring expensive maintenance or chemical treatment. The ability to isolate the produced brine from downstream power producing equipment is desirable.

A fourth limitation of the above methods is that geothermal steam and brine will commonly contain non-condensable gases (NCGs). NCGs cannot be easily separated from the water or steam before producing power, and they often do not contribute significantly to power that is produced. Further, at significant expense, they must be separated from the water in the condenser after the turbine. An abundance of NCGs mixed with a produced geothermal brine is a severe restriction to producing geothermal power. The ability to isolate NCGs from downstream power producing equipment is desirable.

A further limitation of the above methods is that some geothermal resources may be sufficiently hot to produce dry steam, but the steam may not be easily useable to produce power due to corrosive, toxic, or other elements in the steam. A system that can extract heat from dry steam that is isolated from corrosive or toxic elements is desirable.

SUMMARY OF THE DISCLOSURE

In one aspect, embodiments disclosed herein relate to a system for producing fluid and generating thermal or electrical power from a geothermal reservoir. The system may include an outer production conduit for transporting fluids produced from the geothermal reservoir to a production conduit outlet; a heat exchanger disposed within the outer production conduit, the heat exchanger comprising an outer heat exchange conduit and an inner conduit; and a working fluid circulation system for circulating a working fluid through the outer heat exchange conduit and into the inner conduit (or in the opposite direction) by means of a pump and/or a thermosiphon. The system may also include an energy utilization or conversion system for using or converting energy contained in the heated working fluid recovered from the inner conduit.

In some embodiments, the system may include an artificial lift system, the artificial lift system comprising: a gas injector pipe for injecting a lift gas into the outer production conduit, thereby lifting the produced fluids around the outer heat exchange conduit and indirectly heating the working fluid within the outer heat exchange conduit; a submerged pump; or both a submerged pump and a gas injector pipe.

Some embodiments may further include a second heat exchanger for heating the (primary) working fluid or a second working fluid with the fluids produced from the geothermal reservoir and recovered via the production conduit outlet. A second energy utilization or conversion system may also be provided for using or converting energy contained in the heated second working fluid recovered.

In some embodiments, the working fluid may be water, in any phase or combination of phases, including subcritical and supercritical phases. In other embodiments, the working fluid comprises produced fluids or modified produced fluids. The modified produced fluids may include, for example, reconditioned geothermal brine. In yet other embodiments, the working fluid may be a hydrocarbon or a refrigerant in any phase or combination of phases, including subcritical and supercritical phases.

In some embodiments, the lift gas may be non-condensable gases. Non-condensable gases according to embodiments herein may include nitrogen, carbon dioxide, air, natural gas, methane, or combinations thereof, among other compounds or mixtures. In other embodiments, the lift gas may include dissolved gases and/or non-condensable gases recovered from a produced fluid. As such, the lift gas may be a non-condensable gas, generally, or as recovered from the produced fluid.

The system may also include a separation system for separating the lift gas from the produced fluids. The system may further include a lift gas circulation system for reinjecting the separated lift gas using the gas injector pipe. In some embodiments, a heat exchanger may be configured such that the working fluid circulates fully or partially via a thermosiphon effect.

In another aspect, embodiments herein relate to a process for producing fluid and generating thermal or electrical power from a geothermal reservoir. The process may include transporting produced fluids from the geothermal reservoir through an outer production conduit to a production conduit outlet. A working fluid may be circulated through a heat exchanger disposed within the outer production conduit, the heat exchanger comprising an outer heat exchange conduit and an inner conduit. The circulating may include feeding a cool working fluid to the outer heat exchange conduit and recovering a heated working fluid from the inner conduit. The working fluid may also be circulated in the reverse direction. The process may then use or convert energy, contained in the heated working fluid recovered from the inner conduit, to provide thermal or electrical power. In some embodiments, the process may also include lifting the produced fluids via: injecting a lift gas into the outer production conduit proximate a geothermal reservoir, thereby lifting the produced fluids around the outer heat exchange conduit and indirectly heating the working fluid within the outer heat exchange conduit; pumping the produced fluids via a submerged pump; or both.

In another aspect, embodiments herein relate to a process for producing fluid and generating thermal or electrical power from a geothermal reservoir. The process may include producing fluids from a geothermal reservoir via a production conduit. The process may also include circulating a working fluid, comprising the produced fluids or a portion thereof, through a downhole heat exchanger disposed within the production conduit to heat the working fluid via indirect heat exchange with the produced fluids. The process may then use or convert energy, contained in the heated working fluid recovered from the inner conduit, to produce thermal or electrical power.

In some embodiments processes herein may also include removing salts, silica, scale, elements, and/or metals from the produced fluids prior to use of the produced fluids.

In another aspect, embodiments herein relate to a system for producing fluid and generating power or electricity from a geothermal reservoir. The system may include a production conduit for producing fluids from a geothermal reservoir via a production conduit. A downhole heat exchanger (DHX) may be disposed within the production conduit and configured to heat a working fluid, such as the produced fluids or a portion thereof, via indirect heat exchange with the produced fluids. The system may also include an energy use or conversion system for using or converting energy, contained in the heated working fluid, to produce thermal or electrical power.

In some embodiments herein, the system may further include a separation system for removing salts, silica, scale, elements, and/or metals from the produced fluids.

In another aspect, embodiments disclosed herein relate to a system for producing working fluid and generating thermal or electrical power from a geothermal reservoir containing steam. The system may include a heat exchanger disposed within the outer production conduit comprised of a lined well or hole open to the reservoir, the heat exchanger comprising an outer heat exchange conduit and an inner conduit. A working fluid circulation system may be used for circulating a working fluid (a) through the outer heat exchange conduit and into the inner conduit or (b) through the inner heat exchange conduit and into the outer heat exchange conduit. A measurement and control system may provide for controlling the rate of flow of the working fluid in the heat exchanger configured to result in steam condensing into water at or near the surface of the outer conduit of the heat exchanger causing a significant density difference resulting in the condensed steam flowing deeper into the reservoir, thereby causing steam to flow from deeper in the geothermal resource towards the conduit adding advection heating to the conduction heating. In some embodiments, this flow of condensed steam to deeper in the reservoir and adding advection heating will set up a convection loop of water circulating up in the resource and down in the production conduit surrounding the heat exchanger. A system of one or more plugs or other barriers may be disposed in the annulus between the well and the outer conduit of the heat exchanger configured to prevent steam from rising up the annulus around the outer conduit of the heat exchanger rather than condensing into water at or near the surface of the outer conduit of the heat exchanger below the barriers. Further, an energy utilization or conversion system for using or converting energy contained in the heated working fluid recovered from the heat exchanger at the surface for thermal or electrical power. In some embodiments, a system of gas, insulation or other fill material may be installed between the casing of the well or open borehole and outer conduit of the heat exchanger above the plugs of other barriers. In some embodiments, a tube may be inserted between the casing of the well or open borehole and outer conduit of the heat exchanger and pass through such plugs or other barriers to transport any collected NCGs to the surface.

In another aspect, embodiments herein relate to a process for producing working fluid and generating thermal or electrical power from a geothermal reservoir containing steam. The process may include disposing a heat exchanger within the outer production conduit comprised of a lined well or hole open to the reservoir, the heat exchanger comprising an outer heat exchange conduit and an inner conduit. A working fluid may be circulated through the outer heat exchange conduit and into the inner conduit or vice versa. The rate of flow of the working fluid in the heat exchanger may be controlled such that steam condenses into water at the surface of the outer conduit of the heat exchanger, causing a significant density difference resulting in the condensed steam flowing deeper into the reservoir causing steam to flow from deeper in the geothermal resource towards the conduit adding advection heating to the conduction heating. One or more plugs or other barriers in the annulus may be disposed between the well and the outer conduit of the heat exchanger, thereby preventing steam from rising up the annulus around the outer conduit of the heat exchanger rather than condensing into water at the surface of the outer conduit of the heat exchanger below the barriers. The process may also include using or converting energy contained in the heated working fluid recovered from the heat exchanger at the surface for thermal or electrical power. In some embodiments, the process may also include installing gas, insulation or other fill material between the casing of the well or open borehole and outer conduit of the heat exchanger above the plugs of other barriers.

In yet another aspect, embodiments herein relate to a system for producing fluid and generating power or electricity or other conversion technology from a geothermal reservoir containing dry steam. The system may include a heat exchanger disposed within the outer production conduit, and a cased or open hole into the reservoir. The heat exchanger may include an outer heat exchange conduit and an inner conduit. A working fluid circulation system may be provided for circulating a working fluid through the outer heat exchange conduit and into the inner conduit, and a controller may be configured to control a pump rate that results in steam condensing into water at the surface of the outer heat exchanger conduit causing a significant density difference resulting in the condensed steam flowing deeper into the reservoir causing steam to flow towards the conduit. Further, an energy conversion system may be provided for converting energy, contained in the heated working fluid recovered from the inner conduit, to thermal power or electricity. A gas or other fill material may be disposed between the casing and outer conduit to reduce the potential of steam condensing and becoming corrosive due to the reactions of chloride or other chemicals in the superheated steam with condensed steam resulting in HCl or other corrosive chemicals.

Other aspects and advantages will be apparent from the following description and the appended claims.

DETAILED DESCRIPTION

Figure 1:
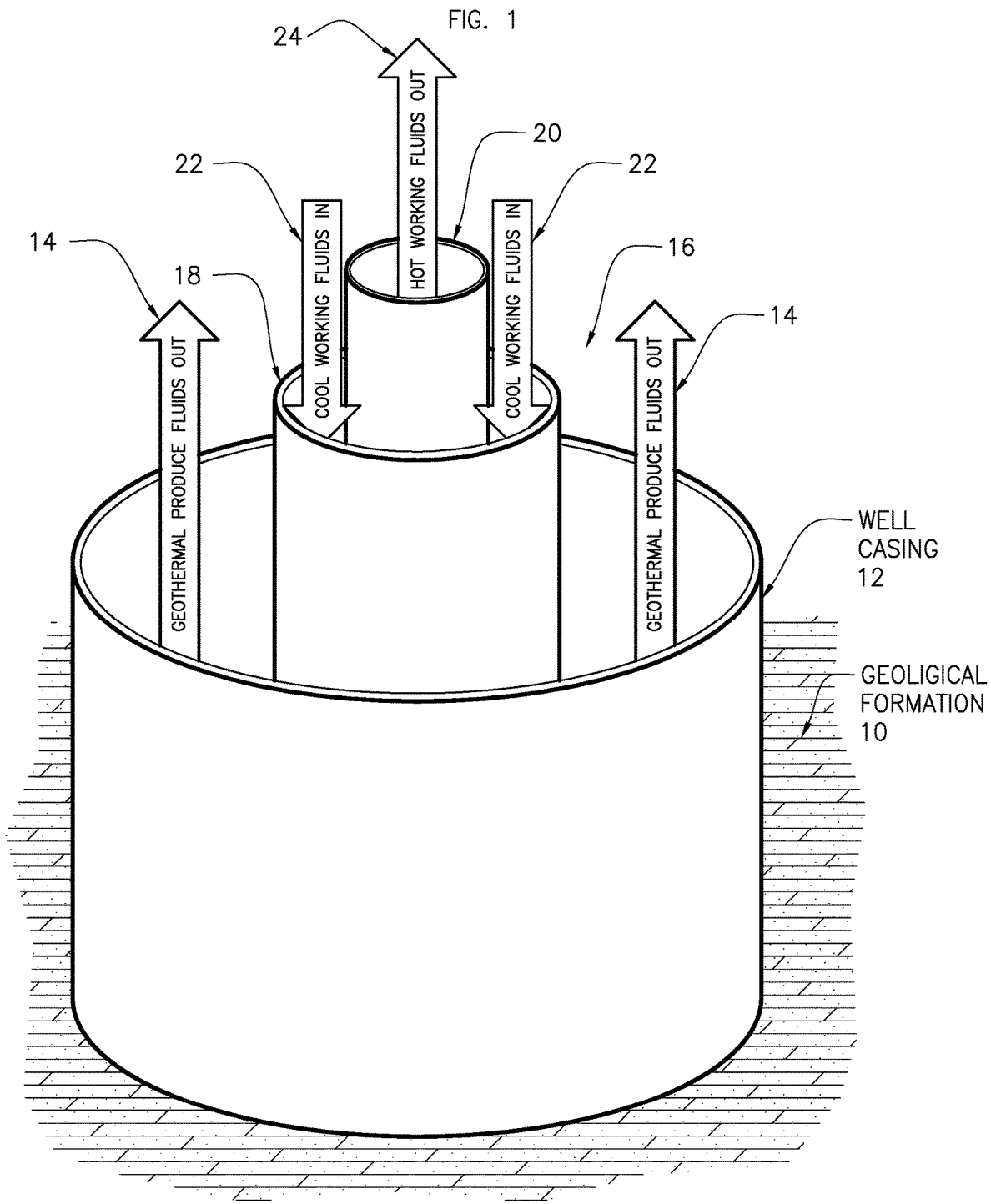
FIG. 1 is an illustration of a downhole heat exchanger according to embodiments herein.

In a geothermal reservoir, the hot fluids are generally under tremendous pressure, the source of this pressure being the rock overburden (lithostatic pressure), the water table (hydrostatic pressure), or some combination of the two. As geothermal fluid comprised of steam and/or brine is produced from a geothermal reservoir via a well, it undergoes a reduction in pressure. Indeed, this pressure difference is what propels the geothermal steam or brine to the surface. Depending on the pressure and the enthalpy of the steam or brine, it may expand or flash to a vapor as it rises up the well. While this does not adversely affect the enthalpy of the produced fluid, it does result in a decreased temperature of the produced mixture of steam and brine. If a heat exchanger only at the surface is used to transfer this heat into a separate working fluid, as is typically used in binary systems, the working fluid cannot be made hotter than the brine and steam temperature at the surface. This limits how much power can be produced.

By inserting a downhole heat exchanger (DHX) into a geothermal well, higher geothermal steam and brine temperatures at depth can be accessed by the heat exchanger. This allows the working fluid circulating in the DHX to be able to produce more power than if the heat exchanger was located at the surface.

While accessing higher temperatures with a DHX that exists downhole is required in some embodiments of this invention, a consequence of inserting the DHX is that the produced brine will not flash, or will not flash as much, as it ascends toward the surface. The transfer of heat to the DHX will cause the production fluid in the well to become cooler and denser, causing a heavier column weight, potentially stopping (or killing) the upward flow of fluid in the well. To prevent or reverse this, such wells can be stimulated, either continuously or as needed, by either gas lifting, through the use of submersible pumps, or a combination of these mechanisms.

In one embodiment of the present invention, there is provided a method for producing a higher-pressure flow of the heated geothermal production fluid from the well. The method of this embodiment comprises: (a) gas lifting the geothermal production fluid around the outside of the DHX installed into the well; (b) pumping a separate high-pressure working fluid to circulate inside the DHX; (c) transferring heat from the geothermal production fluid, as it is produced, to the circulating working fluid inside the DHX; and (d) using the high-pressure working fluid from inside the DHX to produce power. The simultaneous production of the production fluid, circulation of the working fluid in the DHX, and the heat transfer from the production fluid to the working fluid in the DHX is referred to herein as "coproduction."

In another embodiment of the present invention, there is provided a method for coproducing a flow of production and working fluids such that NCGs in the geothermal steam and brine do not come into contact with equipment on the surface that would be negatively affected by such NCGs. The method of this embodiment comprises: (a) gas lifting the geothermal production fluid containing NCGs around the outside of a DHX installed into the well; (b) pumping a separate high-pressure working fluid inside the DHX; (c) transferring heat from the geothermal production fluid, as it is produced, to the circulating working fluid inside the DHX; and (d) using the high-pressure working fluid from inside the DHX to produce thermal or electrical power.

In another embodiment of the present invention, there is provided a method for utilizing NCGs preexisting in the geothermal production fluid brought to the surface or adding NCGs to the geothermal production fluid to further enhance the flow of the geothermal production fluid produced by the well. The method of this embodiment comprises: (a) gas lifting the geothermal production fluid; (b) removing NCGs from the geothermal production fluid brought to the surface; and (c) adding all or a portion of the removed NCGs to the system used to gas lift the geothermal production fluid such that all or a portion of such NCGs are recycled to assist in the gas lift.

In yet another embodiment of the present invention, there is provided a system to extract enthalpy from a geothermal production fluid using a second fluid as the working fluid circulating in a DHX. The DHX system of this embodiment comprises: (a) a tube-in-tube heat exchanger, having (i) an outer tube that is plugged at the bottom and (ii) an insulated tube that is inserted inside the outer tube to return the working fluid to the surface; (b) a pump to provide flow to the circulating working fluid; (c) a flash-tank collector to provide phase separation of the working fluid at the surface (if needed); (d) an offtake system to deliver the gas portion of the working fluid to a turbine to make thermal or electrical power; and (e) a liquid supply of makeup working fluid.

In some embodiments, the coproduced fluid is produced to the surface. For example, the coproduced fluid delivered to the surface may have sufficient pressure to match or exceed the plant system pressure even after heat transfer to a DHX, if present. However, whether or not the plant system pressure is matched or exceeded, a surface heat exchanger (SHX) may be used to capture additional heat from the coproduced fluid in the working fluid that will not contain NCGs, simultaneously separating out the NCGs that often limit power production. The SHX may transfer heat from the coproduced geothermal brine or production fluid to the same working fluids as contemplated for the DHX, such as water, a hydrocarbon, or a refrigerant, and thereafter may use the working fluid from the SHX to produce thermal or electric power. As a gas lift, for example, may be used to deliver higher temperature and pressure production fluid to the SHX, the system may make use of a SHX more efficient or practical in integrating with an existing surface power production plant system. In some embodiments, the SHX may be used to pre-heat, or add supplemental heat to, the working fluid provided to the DHX.

In yet other embodiments of the present invention, the coproduced fluid, such as steam, is not produced to the surface but, instead, is blocked from reaching the surface and the steam is condensed on the cooler DHX at depth with the liquid condensate flowing down to return to the geothermal resource after transferring heat to the working fluid in the DHX. The method of this embodiment comprises: (a) one or more plugs or barriers around the outside of a DHX at depth to prevent steam from rising to the surface in the annulus around the outer conduit of the DHX; (b) steam from the geothermal resource penetrating the well through a slotted liner and condensing on the cooler outer conduit of the DHX with the resulting liquid brine flowing downward to replenish the resource, induce advective steam flow into the well and, where applicable, establish a convective loop of fluid circulating downward in the conduit surrounding the DHX and upward in the geothermal resource to re-enter the conduit surrounding the DHX after having been reheated by the resource; and (c) transferring heat from the steam production fluid and condensate to the circulating working fluid inside the DHX; and (d) using the working fluid from inside the DHX to produce thermal or electrical power.

In still other embodiments, the produced fluid may be produced to the surface using a gas lift. It has been found that the produced fluid delivered to the surface, when using a gas lift to continuously stimulate flow from the well, may have sufficient pressure to match or exceed the plant system pressure. However, whether or not the plant system pressure is matched or exceeded, a surface heat exchanger (SHX) may be used in addition to or in lieu of a DHX to capture heat from the coproduced fluid. The SHX may transfer heat from the produced geothermal brine or production fluid to a working fluid, and thereafter may use the working fluid from the SHX to produce thermal or electric power. The gas used for the gas lift may be a variety of gases, including, without limitation, NCGs that have been recovered from the geothermal brine produced to the surface. Additionally, the gas lift gas may be conditioned by adding water or other fluids to add mass and force to the lift process and reduce the parasitic load of power required to pressurize the gas to optimally lift the co-produced fluid. The gas lift may deliver higher temperature and pressure production fluid to the SHX, allowing the system to make use of a SHX to extract the energy from the produced fluid, allowing a SHX to be used in addition to or in lieu of a DHX in various embodiments. In this manner, the SHX may isolate the lift gas or other NCGs in the produced fluid, so that such do not interact with the turbine.

In sum, the present invention includes novel apparatus and methods of bringing a working fluid to the surface with a higher temperature than the steam or brine comprising the production fluid that is superior to existing geothermal technologies. Various combinations of a SHX and/or DHX inserted into wells that circulate appropriate working fluids in a closed loop together with various production fluid lift methods and/or recirculation methods may be used to substantially increase the production of thermal or electrical power.

In some examples, the working fluid is water, which can be flashed to a precise lower pressure upon leaving the DHX. Once flashed, usually the resulting stream is a mixture of both steam and liquid, which are separated in a flash vessel. The steam portion is directed into the steam delivery and power generation systems of a geothermal power plant, with the steam delivery pressure matched to the requirements of the plant. The liquid portion is combined with fresh makeup water and recycled back into the DHX.

In another example, the working fluid is the produced brine. After deaerating the produced brine to remove NCGs or other undesirable components, the brine can be pressurized and directed to the DHX. When it exits the DHX it can be flashed, with the steam portion delivered to the existing geothermal power plant at the required system pressure. The liquid portion is recycled back into the DHX.

In another example, the working fluid is water. When the water exits the DHX, the heat is transferred to a power generation system through a second heat exchanger at the surface. The heat exchanger at the surface may be part of an organic Rankine cycle power system, many of which are available commercially or already present and at geothermal power plants.

In still another example, the working fluid can be an organic hydrocarbon, refrigerant, or an inorganic fluid, and power can be produced directly from the working fluid as it exits the DHX and expands through a turbine or expander, before being cooled and reinjected into the DHX.

Referring now to FIG. 1, a schematic illustration of the DHX is illustrated. The well drilled into the geological formation 10 (geothermal formation 10) may include a well casing 12 for producing fluids 14 from the geothermal formation. Within the well casing 12 is disposed a heat exchanger 16 for indirectly heating a working fluid with the hot produced fluids.

The heat exchanger in some embodiments is a tube-in-tube heat exchanger, and may include an outer heat exchange conduit 18 and an inner conduit 20. Cool working fluid 22 is circulated through the annulus, between the outer heat exchange conduit 18 and the inner conduit 20, to a terminal or capped end (not shown) of the outer heat exchange conduit and thence into an open end (not shown) of the inner conduit 20. During circulation through the outer heat exchange conduit, the working fluid is heated by indirect heat exchange with the fluids 14 being produced from the formation. A heated working fluid 24 may then be recovered via the inner conduit. The direction of the working fluid may also be reversed.

Such a DHX may be used to produce thermal or electrical power from the geothermal formation. Embodiments of such systems are illustrated in FIGS. 2-8, where like numerals represent like parts.

Figure 2:
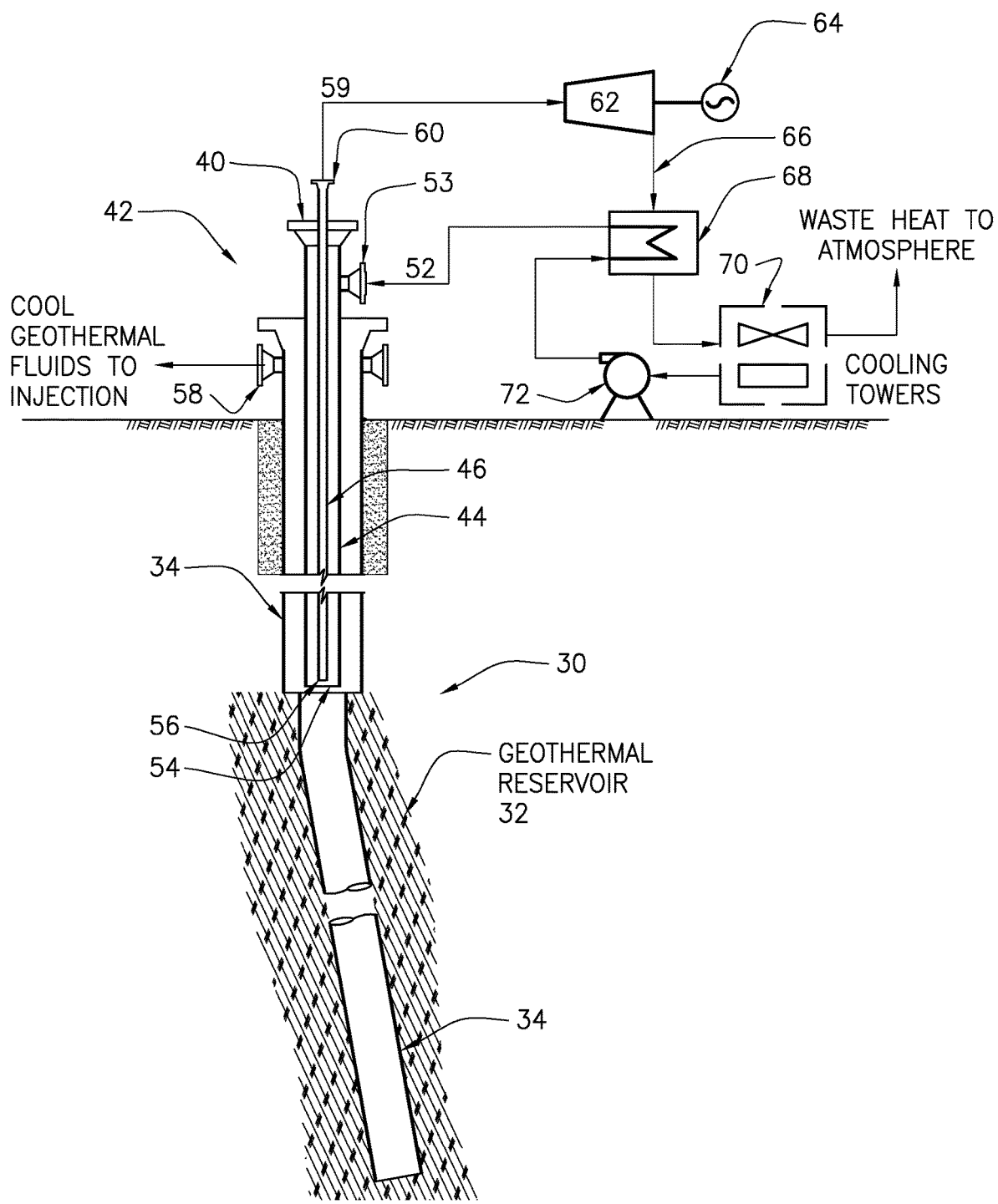
FIG. 2 is a process flow diagram of a system for producing thermal or electrical power from a geothermal reservoir according to embodiments herein.

Referring now to FIG. 2, a system for producing thermal or electrical power from a geothermal reservoir is illustrated. A wellbore 30 may be drilled into a geothermal reservoir 32, and may include one or more sections of a production conduit or casing 34. A downhole heat exchanger 40 may be disposed within the production conduit 34, and may include an outer heat exchange conduit 44 and an inner conduit 46, similar to the tube-in-tube heat exchanger described with respect to FIG. 1. The DHX may extend from the wellhead assembly 42 through the casing 34 to a desired depth, such as above, proximate, or into the geothermal reservoir 32.

Working fluid 52 is circulated into the DHX via inlet 53, through the annulus, between the outer heat exchange conduit 44 and the inner conduit 46, to a terminal or capped end 54 of the outer heat exchange conduit 44 and thence into an open end 56 of the inner conduit 46. During circulation through the outer heat exchange conduit 44, the working fluid is heated by indirect heat exchange with the hot geothermal fluids being produced from the formation and traversing upward through the production conduit 34. The direction of the working fluid may also be reversed. The produced fluids are correspondingly cooled via the indirect heat exchange and recovered via a produced fluids outlet 58.

The produced fluids may be further processed, if desired, and/or injected into the reservoir. In some embodiments, such as where the produced fluid contains sufficient residual energy, additional energy may be extracted from the produced fluids and converted into power or electricity, such as via a second energy conversion system (not illustrated), which may include heat exchangers, turbines and other associated equipment for recovering the residual energy contained in the produced fluids.

The working fluid is gradually heated as it traverses downhole, and a heated working fluid 59 may then enter and traverse through the inner conduit 46, which may be insulated, and be recovered via heated working fluid outlet 60.

Energy transferred to the working fluid in the form of heat may then be utilized by an energy conversion system or may be converted via an energy conversion system, which may include a turbine 62, for example, to produce power or electricity 64. The expanded working fluid 66 may then be cooled, such as via indirect heat exchange within one or more of a feed/effluent exchanger 68, cooling towers 70, or other direct or indirect heat exchange mechanisms (not shown).

Circulation of the working fluid may be provided via a working fluid circulation system. The working fluid circulation system may include a pump 72, valves (not illustrated), associated piping, and other components (temperature and pressure sensors, for example; not shown).

In some embodiments, the working fluid circulation system does not include or require a pump. Rather, the diameters of the DHX and associated components may be configured such that the selected working fluid circulates through the system via a thermosiphon effect.

As noted above, the ability to produce thermal or electrical power, from lower pressure, higher flow geothermal fluids, is desirable. Further, reservoir characteristics may be such that the cooling of the produced fluids, as it (a) rises to the surface and (b) heats the working fluid, may result in decreased flow or may effectively stop production of fluids from the reservoir due to changes in temperature, pressure and density of the produced fluids.

In some embodiments, systems for producing thermal or electrical power from geothermal reservoirs may include an artificial lift mechanism to aid in the transport of the hot produced fluids from the geothermal reservoir across the DHX and to the surface.

Figure 3:
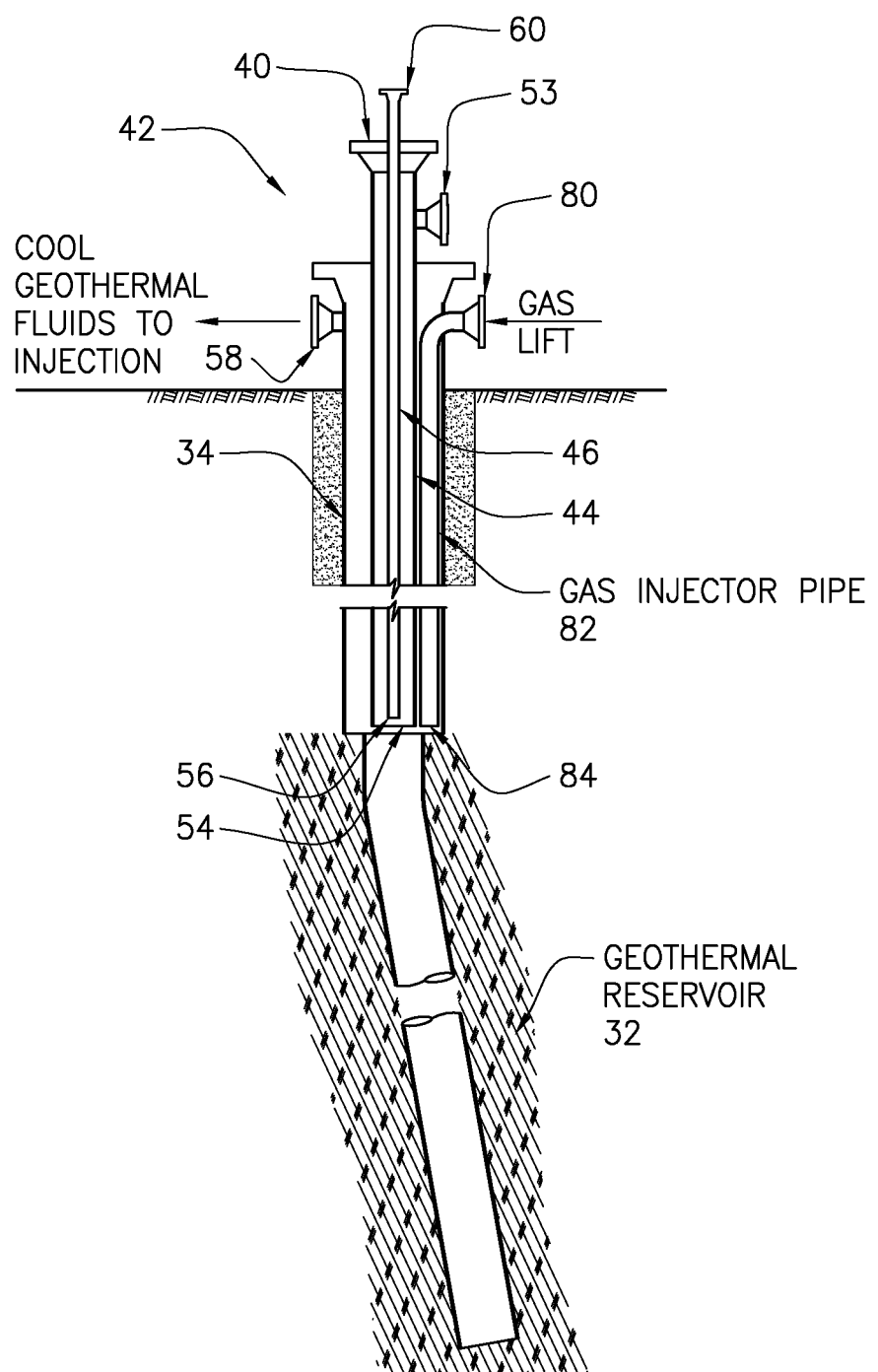
FIG. 3 is a process flow diagram of a system for producing thermal or electrical power from a geothermal reservoir according to embodiments herein.

As illustrated in FIG. 3, the artificial lift mechanism may include a gas lift. A lift gas 80 may be introduced via gas lift injector pipe 82. The gas lift pipe may extend within the wellbore to a depth equivalent to or below the lower end 54 of DHX 40, the lift gas exiting the terminal end 84 of the gas lift injector pipe 82, thereby enhancing the flow of produced fluids from the geothermal reservoir to the surface, and increasing the heat transferred to the working fluid within DHX 40. The lift gas may be introduced via one or more gas distributors, which may be disposed at one or more elevations within the wellbore.

Figure 3A:
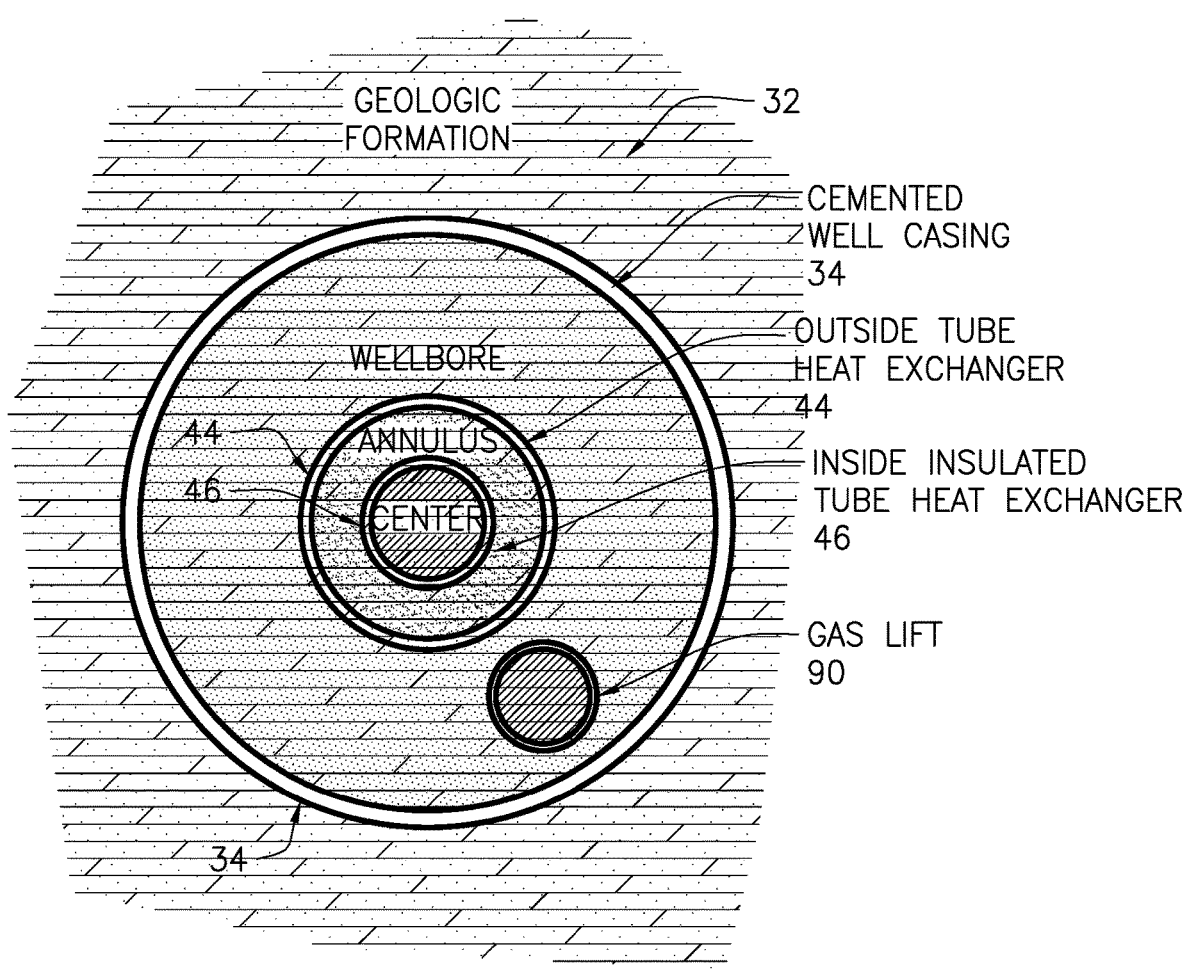
FIG. 3A is a cross section of the wellbore and downhole heat exchanger of FIG. 3 including a gas injection pipe.

As illustrated in FIG. 3A, the gas lift injector pipe 90 may traverse downhole within the annulus formed between the DHX 40 and the casing 34. Alternative means for injecting a lift gas into the wellbore may also be used.

Gas lift is commonly used in geothermal systems to "kick off," or start a non-flowing well. However, as soon as hot water and steam get to the surface, the column of water is light enough to continue the flow without gas assist. In contrast, systems disclosed herein may use a continuous, or intermittent as needed, gas lift to aid in the transport of the hot produced fluids from the geothermal reservoir to the surface to maintain flow of the coproduced geothermal fluid and avoiding the possibility of "killing" the well as previously described.

As noted above, the produced fluids may be further processed, if desired, and/or injected into the reservoir. It has been found that when using a gas lift, such as described above with respect to FIGS. 3 and 3A, the produced fluid delivered to the surface may have sufficient pressure to match or exceed the system plant pressure, and may contain sufficient residual energy for it to be extracted from the produced fluids and converted into power or electricity, such as via a second energy conversion system (not illustrated). The second energy conversion system may include heat exchangers, turbines and other associated equipment for recovering the residual energy contained in the produced fluids.

Figure 4:
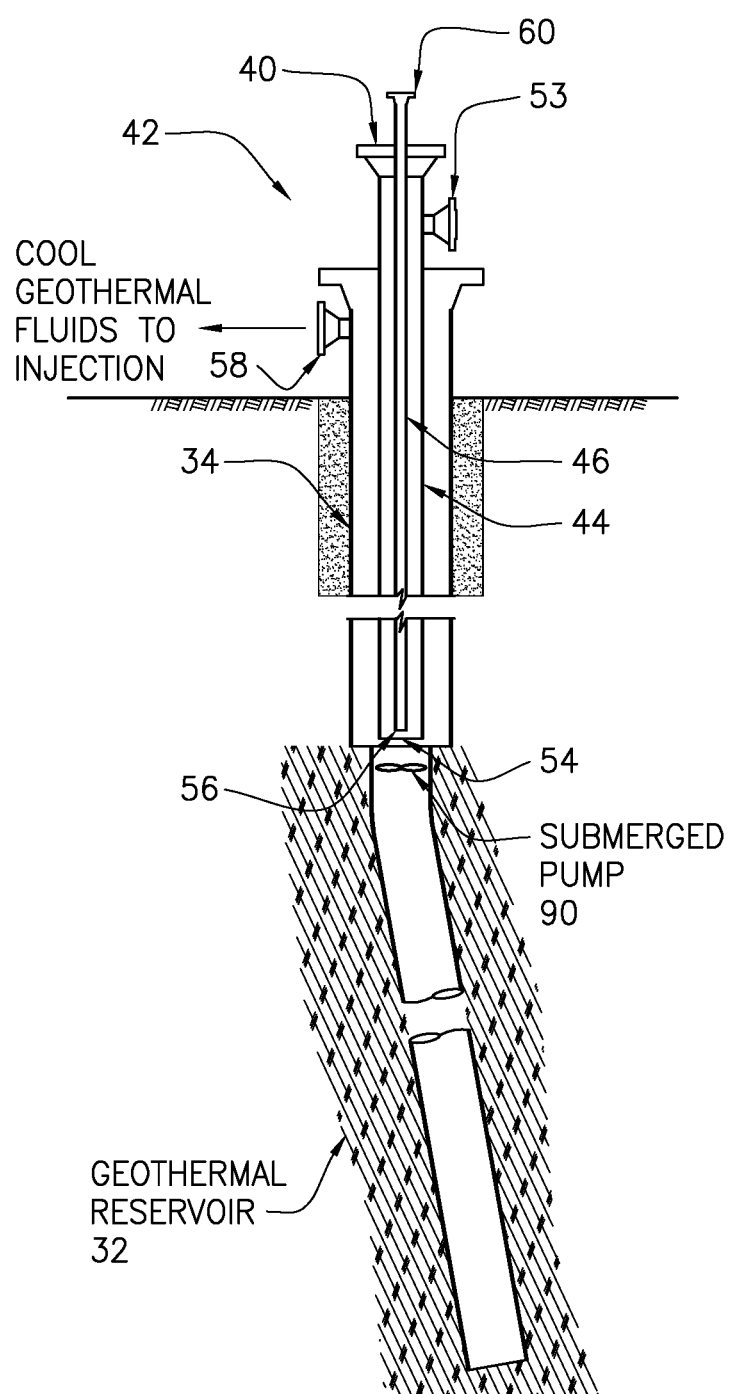
FIG. 4 is a process flow diagram of a system for producing power or electricity from a geothermal reservoir according to embodiments herein.

Alternatively, or additionally, as illustrated in FIG. 4, the artificial lift mechanism may include a submerged pump 90. The submerged pump 90 may be disposed within the wellbore at a depth below the lower end 54 of DHX 40, pumping produced fluids toward the surface, and thereby enhancing the flow of produced fluids from the geothermal reservoir to the surface, and increasing the heat transferred to the working fluid within DHX 40.

In some embodiments, the working fluid comprises water. In other embodiments, the working fluid may be a light hydrocarbon or refrigerant. In yet other embodiments, the working fluid may be carbon dioxide. In other embodiments, the working fluid may comprise the produced fluid or a portion thereof.

Figure 5:
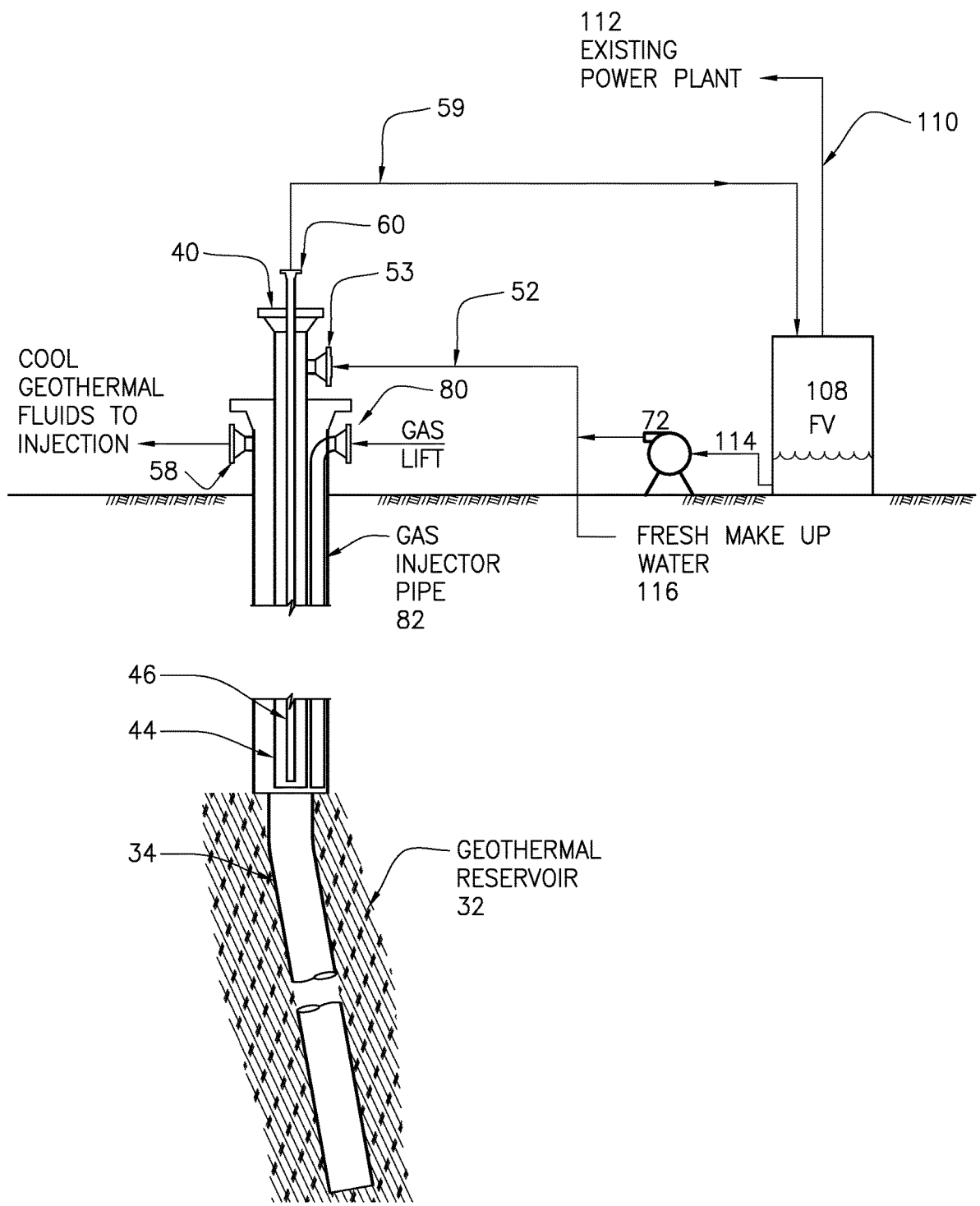
FIG. 5 is a process flow diagram of a system for producing power or electricity from a geothermal reservoir according to embodiments herein.

In each case, the working fluid may be in various or mixed phases. The working fluid may be partially or completely vaporized due the heat exchange within the DHX. In other embodiments, the working fluid may remain pressurized sufficiently such that the working fluid remains as a liquid or in its supercritical phase when recovered at the surface. As shown in FIG. 5, prior to passing the working fluid across a turbine, for example, the heated working fluid 59 may be passed through a vessel 108, such as a flash vessel or separator, to produce the vapors 110 that may be used to rotate a turbine or similarly used at a power plant 112. The non-vaporized liquids 114 may then be drawn from the vessel 108 and recirculated through the DHX via pump 72. As needed, additional working fluid 116 may be added to form the working fluid 52 injected into the DHX 40.

Figure 6:
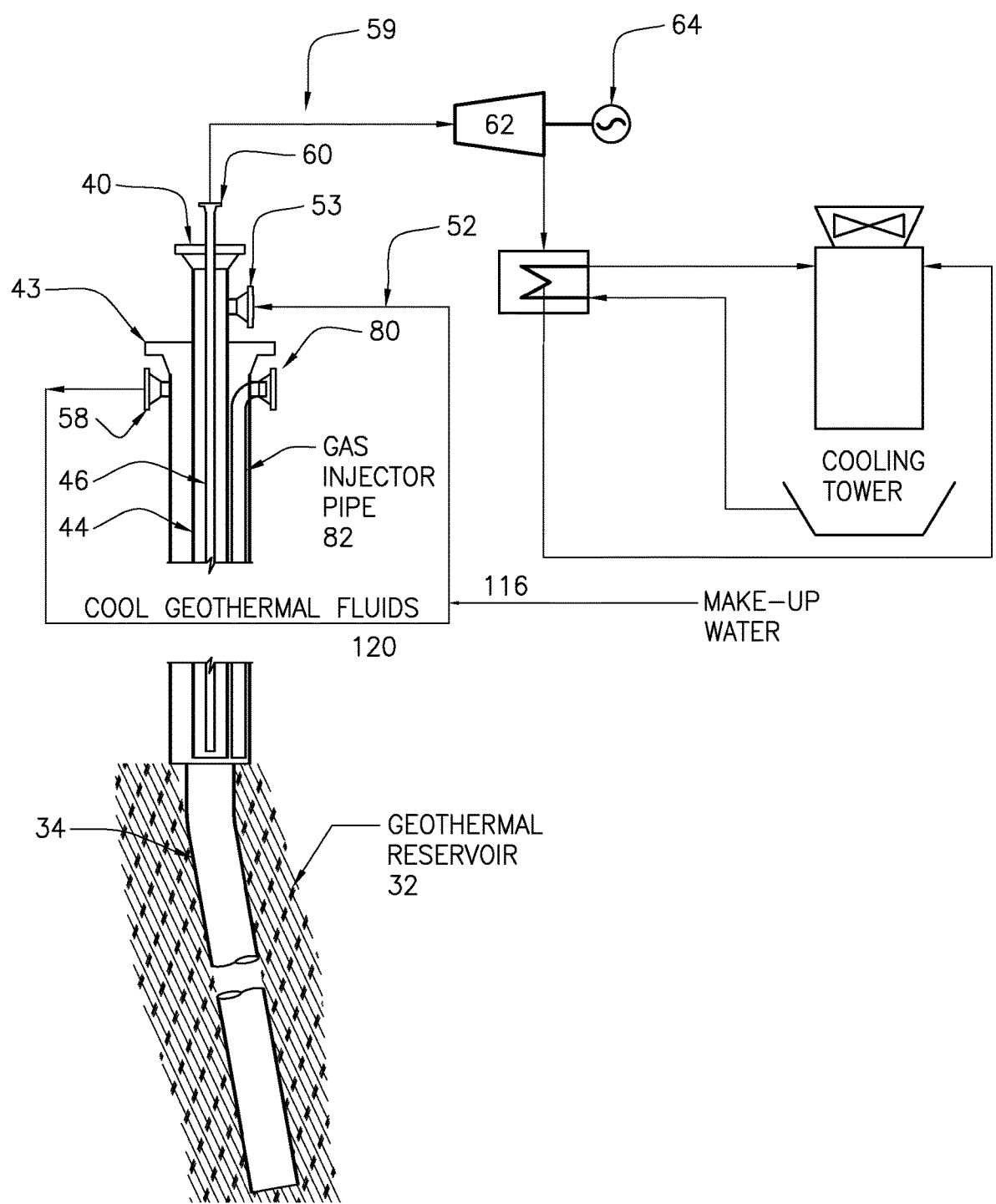
FIG. 6 is a process flow diagram of a system for producing power or electricity from a geothermal reservoir according to embodiments herein.

As noted above, in some embodiments the working fluid may include produced fluids. As illustrated in FIG. 6, a produced fluid, such as a produced brine, may be circulated into the DHX via flow line 120. As needed, additional working fluid 116, or makeup water or brine where the working fluid is a brine, may be added to form the working fluid 52 injected into the DHX 40. In this manner, the loss in energy normally associated with the production of the produced fluid may be enhanced by the DHX to advantageously produce energy from the produced fluid.

Produced fluids often contain dissolved gases that may separate from the liquids in the produced fluids at the lower surface pressures. In such embodiments, depending upon the composition and usefulness of such gases to produce energy via heating in the DHX, it may be desirable to separate the dissolved gases from the produced fluids prior to feeding the produced fluids to the DHX.

Figure 7:
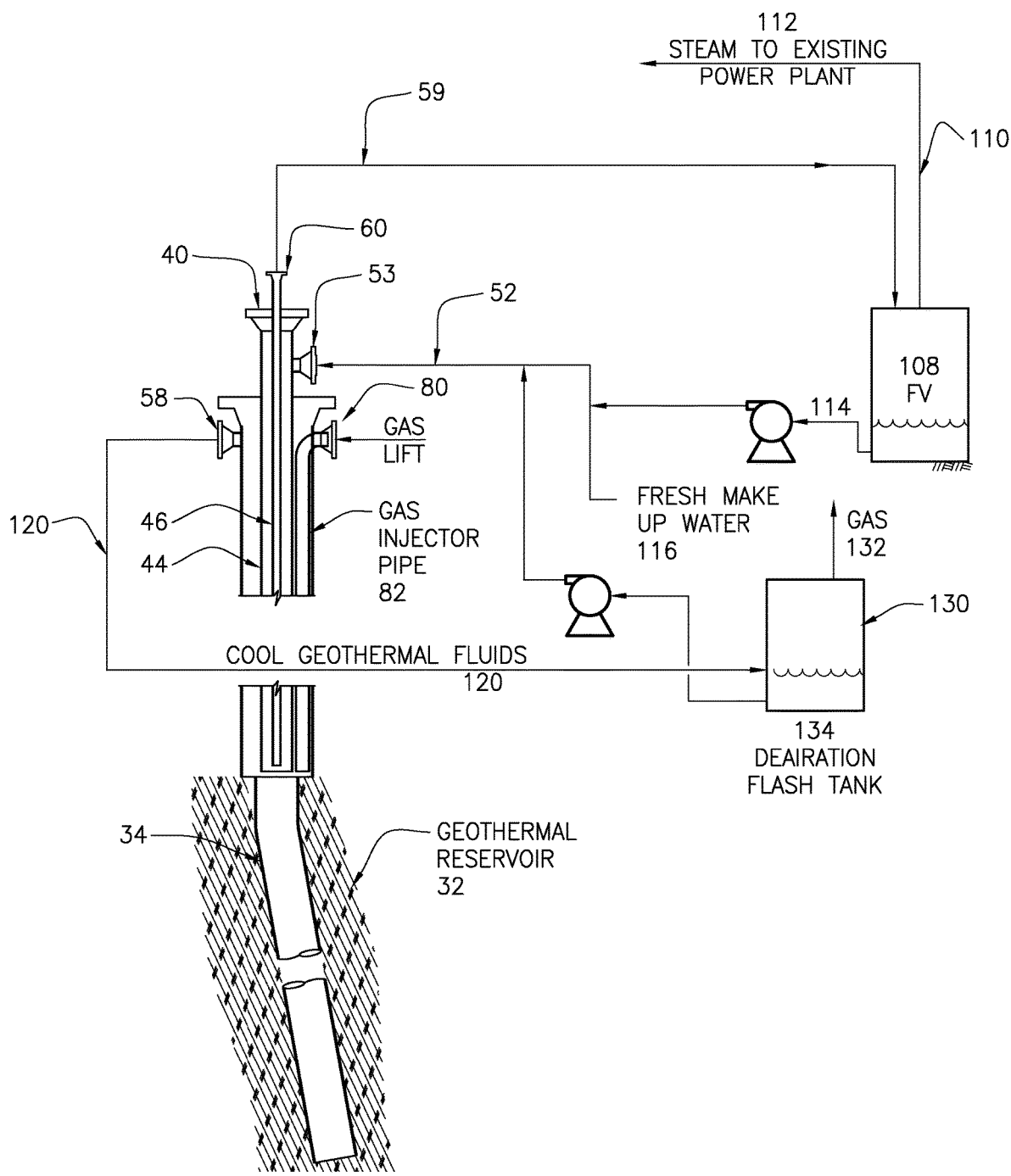
FIG. 7 is a process flow diagram of a system for producing power or electricity from a geothermal reservoir according to embodiments herein.

As illustrated in FIG. 7, the produced fluids may be fed via flow line 120 to a separator 130 to separate the dissolved gases 132 from the liquids 134 in the produced fluids. The recovered gases 132 may be vented or otherwise processed, as needed or required. The liquids 134 may then be fed to the DHX, along with any makeup water or brine 116, for heating in the DHX. Similar to the embodiment of FIG. 6, in this manner, the loss in energy normally associated with the production of the produced fluid may be enhanced by the DHX to advantageously produce energy from the produced fluid.

In other embodiments, the annular region around a portion of the DHX may be blocked or otherwise restrict flow of produced steam. The blocked region may allow the produced steam to collect and condense as it transfers heat to the DHX. The liquid condensate may then descend down the annular region surrounding the DHX for return to the geothermal formation.

Figure 8:
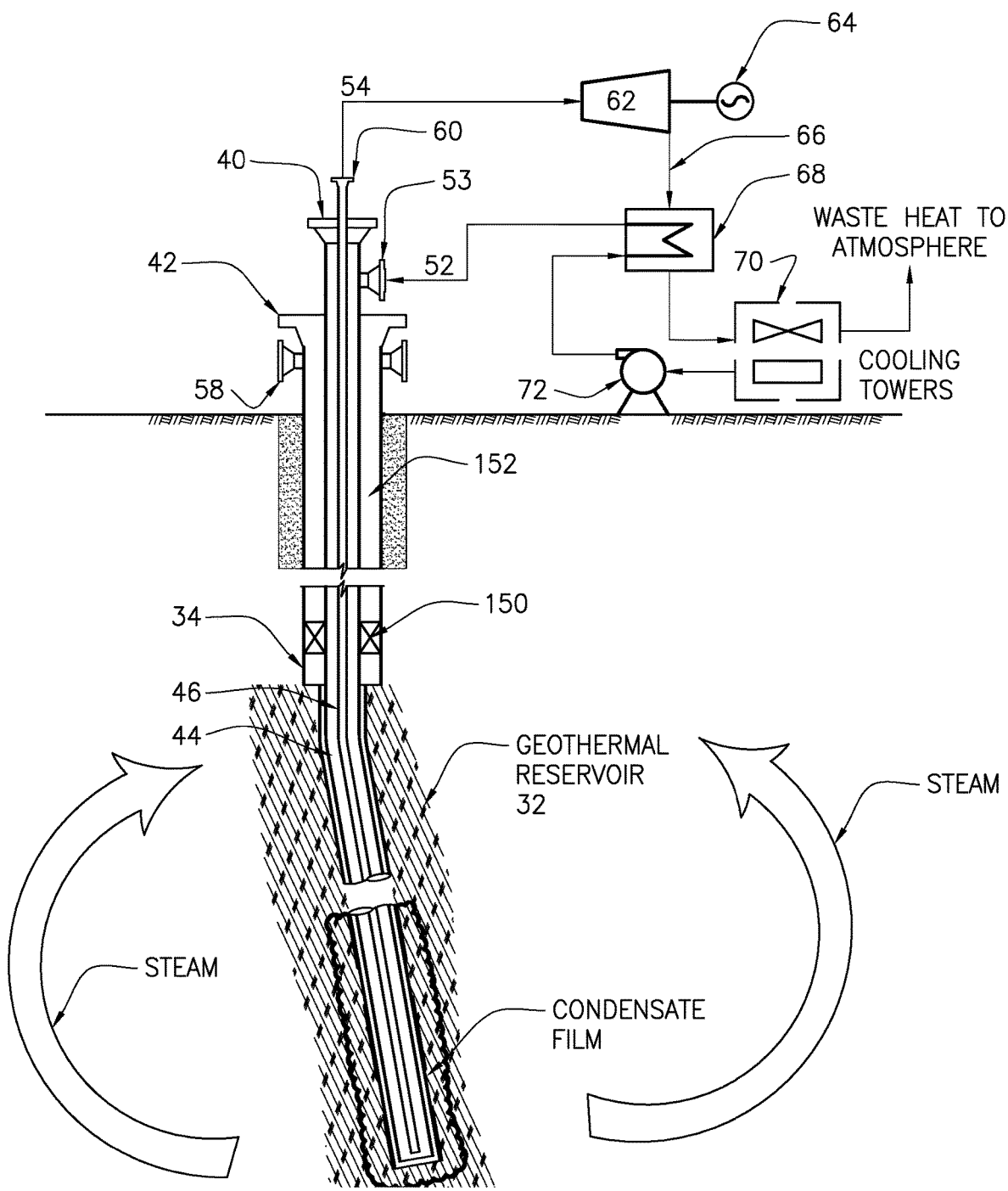
FIG. 8 is an illustration of a well including a blocked annular region for efficient use of steam collected from a geothermal reservoir.

Referring now to FIG. 8, a system for producing working fluid and generating thermal or electrical power from a geothermal reservoir containing steam, where the system includes one or more plugs or barriers to create such a blocked annular region surrounding the DHX, is illustrated. Similar to FIG. 2, the system may include a DHX 40 disposed within an outer production conduit 34, which may include a lined well or hole open to the reservoir. The DHX may include an outer heat exchange conduit 44 and an inner conduit 46. A working fluid circulation system (72, 52, etc.) for circulating a working fluid through the outer heat exchange conduit 44 and into the inner conduit 46 (or in the opposite direction) is also provided.

Steam produced from geothermal reservoir 32 may be collected within production conduit 34, and then come into contact with DHX 40. A system of one or more plugs 150 or other barriers may be disposed in the annulus between the well 34 and the outer conduit 44 of DHX 40. The plugs 150 may prevent steam from rising up the annulus around the outer conduit 44 in zone 152. Rather, heat is efficiently extracted via DHX 40 proximate the lower end thereof, condensing water at the surface of the outer conduit 44 of the heat exchanger.

Similarly, steam produced from geothermal reservoir 32 may be collected within the annulus between a slotted liner and the DHX, and then come into contact with DHX 40. A system of one or more plugs 150 or other barriers may be disposed in the annulus between the well casing 34 and the outer conduit 44 of DHX 40. The plugs 150 may prevent steam from rising up the annulus around the outer conduit 44 in zone 152. Rather, heat is efficiently extracted via DHX 40 proximate the lower end thereof, condensing water at the surface of the outer conduit 44 of the heat exchanger. Condensate will descend downwards and will escape to the reservoir. In some embodiments, this flow of condensed steam to deeper in the reservoir and adding advection heating will set up a convection loop of water circulating up in the resource and down in the conduit, such as a slotted liner, surrounding the heat exchanger, as illustrated in FIG. 8.

A system for controlling the flow rate of the working fluid in the heat exchanger may also be provided. The controller may be configured to maintain the flow rate of the working fluid within a range that produces a desired amount of energy to an energy conversion or utilization system, such as a turbine 72, while also resulting in steam condensing into water at the surface of outer conduit 44 of the heat exchanger, causing a significant density difference and resulting in the condensed steam flowing deeper into the reservoir, thereby causing steam to flow from deeper in the geothermal resource towards the conduit, adding advection heating to the conduction heating. The condensed steam will flow back into the geothermal reservoir. The energy utilization or conversion system, such as turbine 62, may be used for using or converting energy contained in the heated working fluid recovered from DHX 40 at the surface for thermal or electrical power, for example.

The area above plugs or barriers 150, within zone 152, may be empty, or in some embodiments, may be a system of gas, insulation or other fill material (not shown) installed within the annular region between the casing 34 of the well or open borehole and outer conduit 44 of the DXH 40. The plugs or barriers 150 prevent steam from rising to the surface, and the fill material may insulate the heat exchanger from the geothermal resource and/or may be used to reduce the potential for steam from the geothermal resource to condense against the heat exchanger above such plugs or other barriers and becoming corrosive due to chemical reactions of superheated steam with condensed steam.

In other aspects, embodiments disclosed herein relate to a process for producing working fluid and generating thermal or electrical power from a geothermal reservoir containing steam. In some embodiments, the processes may include steps for operating the systems as illustrated and described with respect to FIGS. 1-8.

Processes herein may also include disposing a heat exchanger within an outer production conduit, such as a lined well or hole open to the reservoir. In some embodiments, one or more plugs or other barriers may be disposed in the annulus between the well and the outer conduit of the heat exchanger. Additionally, installing gas, insulation or other fill material may be disposed or installed between the casing of the well or open borehole and the outer conduit of the heat exchanger above the plugs of other barriers. The heat exchanger may include an outer heat exchange conduit and an inner conduit.

The process of generating power may include circulating a working fluid through the outer heat exchange conduit and into the inner conduit, or vice versa (through the inner conduit into the outer conduit). The rate of flow of the working fluid in the heat exchanger may be controlled, such that steam condenses into water at the surface of the outer conduit of the heat exchanger, thereby causing a significant density difference resulting in the condensed steam flowing deeper into the reservoir causing steam to flow from deeper in the geothermal resource towards the conduit adding advection heating to the conduction heating.

The one or more plugs disposed in the annulus between the well and the outer conduit of the heat exchanger may prevent steam from rising up the annulus around the outer conduit of the heat exchanger, rather than condensing into water at the surface of the outer conduit of the heat exchanger. The installed gas, insulation or other fill material between the casing of the well or open borehole and outer conduit of the heat exchanger above the plugs of other barriers may prevent steam from rising to the surface, may insulate the heat exchanger from the geothermal resource, and/or may reduce the potential for steam from the geothermal resource to condense against the heat exchanger above such plugs or other barriers and becoming acidic.

The condensing steam provides heat to the working fluid circulating within the heat exchanger. The process may then utilize or convert the energy contained in the heated working fluid recovered from the heat exchanger at the surface to thermal or electrical power Systems for producing fluid and generating power or electricity or other conversion technology from a geothermal reservoir containing dry steam according to embodiments herein may include a heat exchanger disposed within the outer production conduit, and may include a cased or open hole into the reservoir. The heat exchanger may include, similar to embodiments above, an outer heat exchange conduit and an inner conduit. A working fluid circulation system may be provided for circulating a working fluid through the outer heat exchange conduit and into the inner conduit. The system may include a controller that controls the working fluid circulation rate at a rate that results in steam condensing into water at the surface of the outer heat exchanger conduit, causing a significant density difference resulting in the condensed steam flowing deeper into the reservoir causing steam to flow towards the conduit. Such condensation and flow of condensate adds advection heating to the conduction heating in the system, and significantly increases the heat transfer and establishes as convection loop of water and steam circulating from the outer heat exchange conduit into the resource and back again. The system may further include an energy conversion system for converting energy, contained in the heated working fluid recovered from the inner conduit, to power or electricity. In some embodiments, a gas or other fill material between the casing and outer conduit may be used to reduce the potential of steam condensing and becoming acidic due to the reactions of chloride in the superheated steam with condensed steam, resulting in HCl.

The present description uses numerical ranges to quantify certain parameters relating to the invention. It should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "including," "includes," and "include" have the same open-ended meaning as "comprising," "comprises," and "comprise."

As used herein, the terms "having," "has," and "have" have the same open-ended meaning as "comprising," "comprises," and "comprise."

As used herein, the terms "containing," "contains," and "contain" have the same open-ended meaning as "comprising," "comprises," and "comprise."

As used herein, the terms "a," "an," "the," and "said" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A process for producing fluid and generating thermal or electrical power from a geothermal reservoir containing steam, the process comprising:

producing fluids from a geothermal reservoir via a production conduit;

circulating a working fluid, comprising the produced fluids or a portion thereof, through a downhole heat exchanger disposed within the production conduit to heat the working fluid via indirect heat exchange with the produced fluids;

using or converting energy, contained in the heated working fluid recovered from the inner conduit, to produce thermal or electrical power;

the process further comprising:

disposing the heat exchanger within the production conduit, comprised of a well casing or open borehole, the heat exchanger comprising an outer heat exchange conduit and an inner conduit;

circulating the working fluid through the outer heat exchange conduit and into the inner conduit or vice versa;

controlling the rate of flow of the working fluid in the heat exchanger such that steam condenses into water at the surface of the outer conduit of the heat exchanger causing a significant density difference resulting in the condensed steam flowing deeper into the reservoir causing steam to flow from deeper in the geothermal resource towards the conduit adding advection heating to the conduction heating;

disposing one or more plugs or other barriers in the annulus between the well and the outer conduit of the heat exchanger thereby preventing steam from rising up the annulus around the outer conduit of the heat exchanger rather than condensing into water at the surface of the outer conduit of the heat exchanger below the barriers; and installing gas, insulation or other fill material between the casing of the well or open borehole and the outer conduit of the heat exchanger above the plugs or other barriers.

2. The process of claim 1, further comprising separating dissolved gases from the produced fluids.

3. The process of claim 1, further comprising artificially lifting the produced fluids.

4. The process of claim 3, wherein the artificial lifting comprises pumping the produced fluids via a submersible pump.

5. The process of claim 4, wherein the artificial lifting further comprises injecting a lift gas into the production conduit.

6. The process of claim 3, wherein the artificial lifting comprises injecting a lift gas into the production conduit.

7. The process of claim 6, further comprising separating dissolved gases and/or lift gas from the produced fluids.

8. A system for producing fluid and generating thermal or electrical power from a geothermal reservoir containing steam, the system comprising:

an outer production conduit for transporting fluids produced from the geothermal reservoir to a production conduit outlet;

a heat exchanger, configured to heat a working fluid and to provide a heated working fluid, disposed within the outer production conduit, comprised of a well casino or open borehole, the heat exchanger comprising an outer heat exchange conduit and an inner conduit;

a working fluid circulation system for circulating the working fluid through the outer heat exchange conduit and into the inner conduit, or through the inner conduit and into the outer conduit, by means of a pump and/or thermosiphon;

an energy utilization or conversion system for using or converting energy contained in the heated working fluid;

a measurement and control system for controlling the rate of flow of the working fluid in the heat exchanger configured to result in steam condensing into water at the surface of the outer conduit of the heat exchanger causing a density difference resulting in the condensed steam flowing deeper into the reservoir causing steam to flow from deeper in the geothermal resource towards the conduit adding advection heating to the conduction heating; and a system of one or more plugs or other barriers disposed in the annulus between the well and the outer conduit of the heat exchanger configured to prevent steam from rising up the annulus around the outer conduit of the heat exchanger rather than condensing into water at the surface of the outer conduit of the heat exchanger below the barriers.

9. The system of claim 8, further comprising a system of gas, insulation or other fill material installed between the casing of the well or open borehole and outer conduit of the heat exchanger above the plugs or other barriers.

10. The system of 8, further comprising an artificial lift system, the artificial lift system comprising:

a gas injector pipe for injecting a lift gas into the outer production conduit, thereby lifting the produced fluids around the outer heat exchange conduit and indirectly heating the working fluid within the outer heat exchange conduit;

a submerged pump; or both a submerged pump and a gas injector pipe.

11. The system of claim 10, further comprising:

a second heat exchanger for heating the working fluid or a second working fluid with the fluids produced from the geothermal reservoir and recovered via the production conduit outlet; and optionally, a second energy utilization or conversion system, for using or converting energy contained in the heated second working fluid recovered.

12. The system of claim 10, further comprising a separation system for separating the lift gas from the produced fluids.

13. The system of claim 12, further comprising a lift gas circulation system for reinjecting the separated lift gas using the gas injector pipe.

14. A system for producing fluid and generating thermal or electrical power from a geothermal reservoir containing steam, the system comprising:

an outer production conduit for transporting fluids produced from the geothermal reservoir to a production conduit outlet;

a heat exchanger, configured to heat a working fluid and to provide a heated working fluid, disposed within the outer production conduit, comprised of a well casino or open borehole, the heat exchanger comprising an outer heat exchange conduit and an inner conduit;

a working fluid circulation system for circulating the working fluid through the outer heat exchange conduit and into the inner conduit, or through the inner conduit and into the outer conduit, by means of a pump and/or thermosiphon;

an energy utilization or conversion system for using or converting energy contained in the heated working fluid;

a cased or open hole into the reservoir;

a controller configured to control a pump rate that results in steam condensing into water at the surface of the outer heat exchanger conduit causing a density difference resulting in the condensed steam flowing deeper into the reservoir causing steam to flow towards the conduit; and a gas or other fill material between the casing and outer conduit to reduce the potential of steam condensing and becoming corrosive due to the reactions of chloride or other chemicals in the superheated steam with condensed steam resulting in HCl or other corrosive chemicals.

15. The system of claim 14, further comprising an artificial lift system, the artificial lift system comprising:

a gas injector pipe for injecting a lift gas into the outer production conduit, thereby lifting the produced fluids around the outer heat exchange conduit and indirectly heating the working fluid within the outer heat exchange conduit;

a submerged pump; or both a submerged pump and a gas injector pipe.

16. The system of claim 15, further comprising:
a second heat exchanger for heating the working fluid or a second working fluid with the fluids produced from the geothermal reservoir and recovered via the production conduit outlet; and
optionally, a second energy utilization or conversion system, for using or converting energy contained in the heated second working fluid recovered.

17. The system of claim 15, further comprising a separation system for separating the lift gas from the produced fluids.

18. The system of claim 17, further comprising a lift gas circulation system for reinjecting the separated lift gas using the gas injector pipe.

19. A system for producing fluid and generating thermal or electrical power from a geothermal reservoir containing steam, the system comprising:
an outer production conduit for transporting fluids produced from the geothermal reservoir to a production conduit outlet;
a heat exchanger, configured to heat a working fluid and to provide a heated working fluid, disposed within the outer production conduit, the heat exchanger comprising an outer heat exchange conduit and an inner conduit;
a working fluid circulation system for circulating the working fluid through the outer heat exchange conduit and into the inner conduit, or through the inner conduit and into the outer conduit, by means of a pump and/or thermosiphon;
an energy utilization or conversion system for using or converting energy contained in the heated working fluid;
a measurement and control system for controlling the rate of flow of the working fluid in the heat exchanger configured to result in steam condensing into water at the surface of the outer conduit of the heat exchanger causing a density difference resulting in the condensed steam flowing deeper into the reservoir causing steam to flow from deeper in the geothermal resource towards the conduit adding advection heating to the conduction heating.

* * * * *